US010257984B2

(12) United States Patent
Coppinger et al.

(10) Patent No.: US 10,257,984 B2
(45) Date of Patent: Apr. 16, 2019

(54) AGRICULTURAL HARVESTER WITH PADDLES ROTATED ABOUT AN AXIS OF ROTATION THAT IS PARALLEL TO A LONGITUDINAL AXIS OF THE HARVESTER

(71) Applicant: CNH Industrial America LLC, New Holland, PA (US)

(72) Inventors: Jason R. Coppinger, Davenport, IA (US); Pieter Vandevelde, Sint Michiels Brugge (BE); Eric E. Veikle, Lititz, PA (US); Pieter J. P. Willem, Gistel (BE); Cale N. Boriack, Lititz, PA (US)

(73) Assignee: CNH Industrial America LLC, New Holland, PA (US)

( * ) Notice: Subject to any disclaimer, the term of this patent is extended or adjusted under 35 U.S.C. 154(b) by 12 days.

(21) Appl. No.: 15/526,918

(22) PCT Filed: Nov. 13, 2015

(86) PCT No.: PCT/US2015/060561
§ 371 (c)(1),
(2) Date: May 15, 2017

(87) PCT Pub. No.: WO2016/077686
PCT Pub. Date: May 19, 2016

(65) Prior Publication Data
US 2017/0339833 A1 Nov. 30, 2017

Related U.S. Application Data

(60) Provisional application No. 62/079,953, filed on Nov. 14, 2014.

(51) Int. Cl.
*A01F 12/46* (2006.01)
*A01D 41/127* (2006.01)

(52) U.S. Cl.
CPC .......... *A01F 12/46* (2013.01); *A01D 41/1274* (2013.01)

(58) Field of Classification Search
CPC ....... A01F 12/46; A01F 12/60; A01D 61/008; A01D 61/00; A01D 61/04; A01D 41/1217;
(Continued)

(56) References Cited

U.S. PATENT DOCUMENTS 693,505 A    2/1902  Elder et al.
2,131,273 A  9/1938  Coultas et al.
(Continued)

FOREIGN PATENT DOCUMENTS

DE    1216602 B      5/1966
EP    1298077 A2 *   4/2003    ............. A01F 12/46
(Continued)

*Primary Examiner* — Arpad Fabian-Kovacs
(74) *Attorney, Agent, or Firm* — Patrick M. Sheldrake; Peter K. Zacharias

(57) ABSTRACT

An agricultural harvester (10) defining a longitudinal axis (LI) includes a chassis; at least one ground engaging traction member carried by the chassis (12); a cleaning system (26) carried by the chassis that is configured to clean crop material; and a generally vertical crop material elevator (60) carried by the chassis. The crop material elevator (60) includes a housing (78) having an inlet (76) formed therethrough; a driving loop (88) held within the housing; a plurality of paddles (90) connected to the driving loop; and a rotating element (92) configured to rotate the plurality of paddles about an axis of rotation that is generally parallel to the longitudinal axis. The agricultural harvester (10) also includes a crop material conveyor (70) configured to supply cleaned crop material to the inlet of the crop material elevator from the cleaning system.

19 Claims, 4 Drawing Sheets

(58) Field of Classification Search
CPC .. A01D 41/1208; A01D 41/12; A01D 61/002;
G01F 1/30; B65G 15/08; B65G 17/126;
B65G 17/32
See application file for complete search history.

(56) References Cited

U.S. PATENT DOCUMENTS

| | | | |
|---|---|---|---|
| 3,209,758 A | 10/1965 | Nilsson et al. | |
| 3,580,257 A * | 5/1971 | Teague | A01D 41/1208 460/1 |
| 3,643,826 A * | 2/1972 | Weakly | A01F 12/46 414/502 |
| 4,765,190 A * | 8/1988 | Strubbe | A01D 41/1271 222/71 |
| 4,800,902 A * | 1/1989 | Maust | A01D 41/1208 460/114 |
| 5,380,247 A | 1/1995 | Underwood | |
| 5,453,050 A * | 9/1995 | Underwood | A01D 41/1208 460/114 |
| 5,509,854 A | 4/1996 | Underwood | |
| 5,863,247 A * | 1/1999 | Behnke | G01G 11/00 460/114 |
| 6,350,197 B1 * | 2/2002 | Cooksey | A01F 12/46 460/114 |
| 6,899,616 B1 * | 5/2005 | Murray | A01D 75/28 460/6 |
| 7,040,980 B1 * | 5/2006 | Kestel | A01D 41/1217 414/345 |
| 7,690,973 B2 * | 4/2010 | Becker | A01F 12/46 460/114 |
| 7,833,091 B2 * | 11/2010 | Holtmann | A01D 41/12 460/114 |
| 7,862,286 B2 | 1/2011 | Mackin et al. | |
| 7,874,899 B2 | 1/2011 | Mackin et al. | |
| 8,007,353 B1 * | 8/2011 | Werning | A01F 12/46 460/13 |
| 8,801,514 B1 * | 8/2014 | McCully | A01F 12/46 460/114 |
| 9,295,197 B1 * | 3/2016 | Veikle | A01D 61/04 |
| 9,371,187 B2 * | 6/2016 | Priepke | A01D 41/1217 |
| 9,736,985 B2 * | 8/2017 | Vandevelde | A01F 12/46 |
| 9,877,431 B2 * | 1/2018 | Vandevelde | A01F 12/46 |
| 9,955,629 B2 * | 5/2018 | Vandevelde | A01F 12/46 |
| 2014/0329572 A1 * | 11/2014 | McCully | A01D 61/008 460/114 |
| 2015/0344230 A1 * | 12/2015 | Hollatz | A01F 12/46 460/114 |
| 2015/0366140 A1 * | 12/2015 | Strnad | A01F 12/46 460/114 |
| 2016/0057926 A1 * | 3/2016 | Roe | A01F 12/46 56/14.6 |
| 2016/0135371 A1 * | 5/2016 | Vandevelde | A01F 12/46 460/114 |
| 2016/0278293 A1 * | 9/2016 | Temple | A01F 12/46 |
| 2016/0316627 A1 * | 11/2016 | Brockel | A01D 61/00 |
| 2016/0316632 A1 * | 11/2016 | Vandevelde | A01F 12/444 |
| 2017/0000033 A1 * | 1/2017 | Vandevelde | A01D 61/008 |
| 2017/0332555 A1 * | 11/2017 | Farley | A01F 12/46 |
| 2018/0042177 A1 * | 2/2018 | Baert | A01D 41/1272 |
| 2018/0087939 A1 * | 3/2018 | Brandmeier | G01F 1/206 |

FOREIGN PATENT DOCUMENTS

| | | | | |
|---|---|---|---|---|
| EP | 1310151 A1 * | 5/2003 | | A01F 12/46 |
| WO | 2015052563 A1 | 4/2015 | | |
| WO | WO-2015052563 A1 * | 4/2015 | | A01F 12/46 |

* cited by examiner

AGRICULTURAL HARVESTER WITH PADDLES ROTATED ABOUT AN AXIS OF ROTATION THAT IS PARALLEL TO A LONGITUDINAL AXIS OF THE HARVESTER

BACKGROUND OF THE INVENTION

1. Field of the Invention

The present invention relates to agricultural harvesters, and, more particularly, to agricultural harvesters equipped with elevators.

2. Description of the Related Art

Combines are used to harvest agricultural crops such as corn, soybeans, wheat and other grain crops. As the combine is driven through crop fields, the combine cuts the crop, separates the desired crop from the undesired waste, stores the crop, and discards the waste.

In a typical combine, a header is mounted to the front of the combine to gather the crop and feed the crop into the combine for processing. As the combine is driven through the field, the crop material is collected by the header and deposited into a feeder housing. The crop material is then transported upwardly and into the combine by a feed elevator located within the feeder housing. The crop material then passes through a threshing and separating mechanism. In a rotary combine, the threshing and separating mechanism includes a rotor, a threshing concave, a rotor cage, and a separating grate. As crop material passes between the rotor, the threshing concave and the separating grate, the crop material is impacted and/or rubbed, thereby causing the grain to separate from the stalk material. The stalk material that is separated from the grain is commonly referred to as material other than grain (MOG). Other types of combines are also known that perform similar functions using different mechanisms.

After passing through the threshing and separating assembly, the grain and MOG are deposited onto a grain cleaning system. The grain cleaning system of a typical combine includes a plurality of adjustable cleaning sieves, often referred to as a chaffer sieve and a shoe sieve. The sieves are typically reciprocated back and forth in opposite directions along an arcuate path. This motion has the tendency to separate the grain from the MOG. To further separate the grain from the MOG, a cleaning fan or blower is positioned so as to blow air up through the cleaning sieves. This flow of air tends to blow the MOG, which is typically lighter than grain, rearwardly and out the back of the combine. Grain, which is heavier than MOG, is allowed to drop through the openings in the sieve.

The clean grain that falls through the cleaning sieves is deposited on a collection panel positioned beneath the cleaning sieves. The collection panel is angled so as to permit the grain to flow, under the influence of gravity, into an auger trough positioned along the lowermost edge of the collection panel. The auger trough is typically positioned near the forward end of the cleaning sieves and extends along the width of the sieves. The grain collected in the auger trough is then moved by an auger towards the side of the combine where it is raised by a grain elevator and deposited into a storage tank or grain tank. Other systems also exist that can utilize, for example, a loop conveyor system which eliminates the need for a conventional cross auger.

As combine harvesters have gotten larger and able to provide increased harvesting capacity, the grain elevators that raise the cleaned grain have had to also increase their capacity to keep up with the other systems of the harvester. One way of increasing the capacity of a grain elevator is to increase the width of the elevator housing and paddles to increase the size of the conveying area, but the conveying area size increase is restricted by the machine envelope requirements of the combine harvester. Further, increasing the capacity of the grain elevator can cause grain damage and accelerate wear to unacceptable levels.

What is needed in the art is a crop material elevator with a high capacity and fewer disadvantages than presently known crop material elevators.

SUMMARY OF THE INVENTION

The present invention provides an agricultural harvester having a crop material elevator with paddles that rotate about an axis of rotation which is parallel to a side of the agricultural harvester.

The invention in one form is directed to an agricultural harvester defining a longitudinal axis that includes a chassis; at least one ground engaging traction member carried by the chassis; a cleaning system carried by the chassis that is configured to clean crop material; and a generally vertical crop material elevator carried by the chassis. The crop material elevator includes a housing having an inlet formed therethrough; a driving loop held within the housing; a plurality of paddles connected to the driving loop; and a rotating element configured to rotate the plurality of paddles about an axis of rotation that is generally parallel to the longitudinal axis. The agricultural harvester also includes a crop material conveyor configured to supply cleaned crop material to the inlet of the crop material elevator from the cleaning system.

The invention in another form is directed to a crop material transport system including a cleaning system having a side sheet that defines a side plane with a crop material opening formed through and a crop material conveyor extending through the crop material opening, the cleaning system being configured to clean harvested crop material; and a generally vertical crop material elevator supplied with cleaned crop material from the crop material conveyor. The crop material elevator includes a housing having an inlet formed therethrough that is supplied with the cleaned crop material; a driving loop held within the housing; a plurality of paddles connected to the driving loop; and a rotating element configured to rotate the plurality of paddles about an axis of rotation that is generally parallel to the side plane.

An advantage of the present invention is that a conveying area size of the crop material elevator can be increased with less of an effect on the machine envelope requirements of the agricultural harvester.

Another advantage is a bottom of the crop material elevator according to the present invention can be placed higher than known crop material elevators to increase the ground clearance of the agricultural harvester.

Yet another advantage is that the crop material raised by the crop material elevator according to the present invention experiences fewer direction changes during raising which can reduce damage to the crop material.

BRIEF DESCRIPTION OF THE DRAWINGS

The above-mentioned and other features and advantages of this invention, and the manner of attaining them, will become more apparent and the invention will be better understood by reference to the following description of embodiments of the invention taken in conjunction with the accompanying drawings, wherein.

Corresponding reference characters indicate corresponding parts throughout the several views. The exemplifications set out herein illustrate embodiments of the invention and such exemplifications are not to be construed as limiting the scope of the invention in any manner.

DETAILED DESCRIPTION OF THE INVENTION

The terms "grain", "straw" and "tailings" are used principally throughout this specification for convenience but it is to be understood that these terms are not intended to be limiting. Thus "grain" refers to that part of the crop material which is threshed and separated from the discardable part of the crop material, which is referred to as non-grain crop material, MOG or straw. Incompletely threshed crop material is referred to as "tailings". Also the terms "forward", "rearward", "left" and "right", when used in connection with the agricultural harvester and/or components thereof are usually determined with reference to the direction of forward operative travel of the harvester, but again, they should not be construed as limiting. The terms "longitudinal" and "transverse" are determined with reference to the fore-and-aft direction of the agricultural harvester and are equally not to be construed as limiting. As can be seen, a longitudinal axis L1 of the combine 10 is defined through the combine 10 in a direction of the combine's 10 forward and rearward operative travel.

Figure 1:
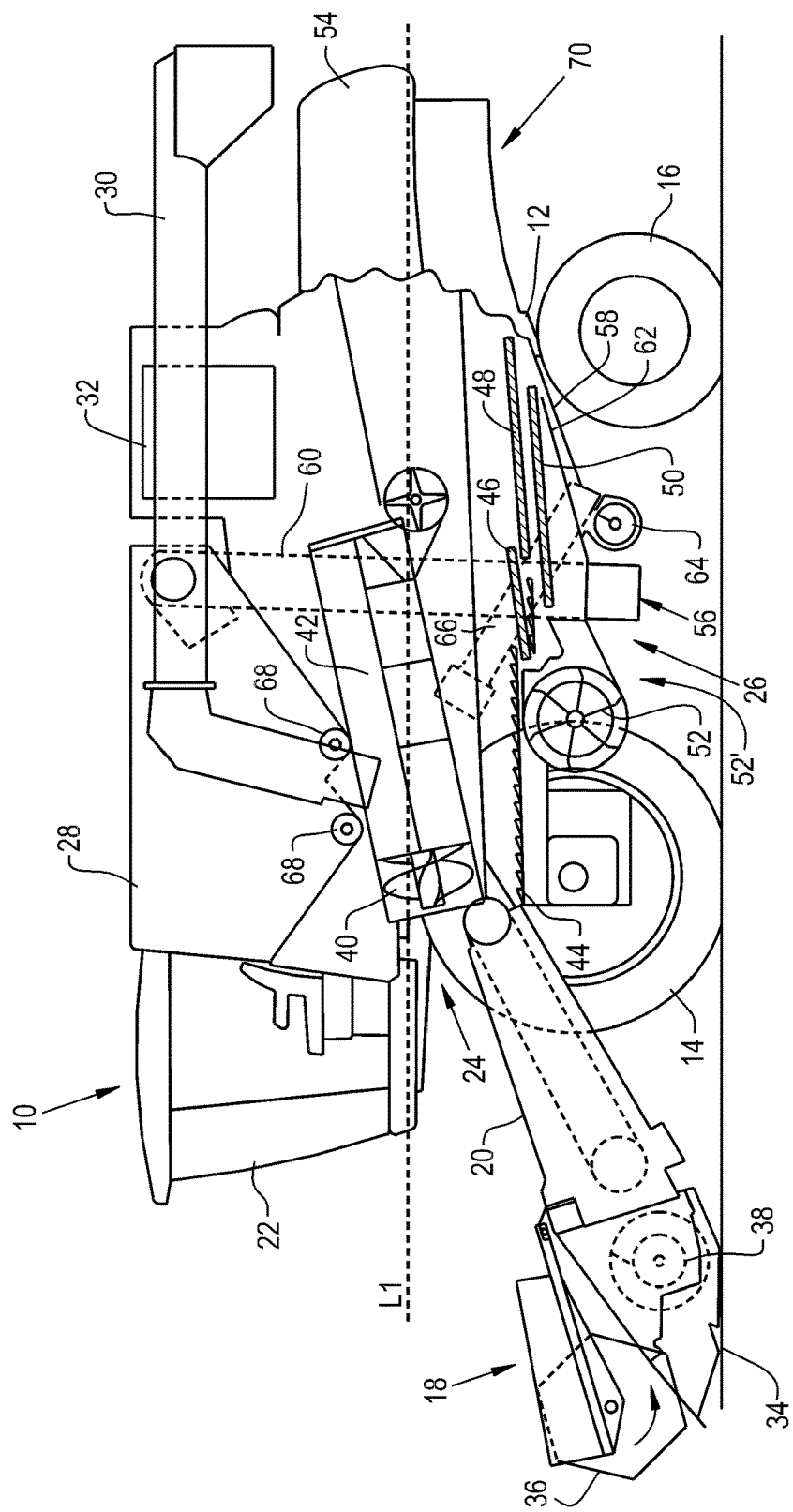
FIG. 1 is a side view of an embodiment of an agricultural harvester according to the present invention.

Referring now to the drawings, and more particularly to FIG. 1, there is shown an agricultural harvester in the form of a combine 10, which generally includes a chassis 12, ground engaging wheels 14 and 16, a header 18, a feeder housing 20, an operator cab 22, a threshing and separating system 24, a cleaning system 26, a grain tank 28, and an unloading auger 30. It should be appreciated that while the agricultural harvester is shown as combine 10, the agricultural harvester according to the present invention can be any type of construction that allows for crop material to be harvested such as a conventional combine (which does not have a rotor), rotary combine, hybrid combine, chopper harvester, etc.

Front wheels 14 are generally larger wheels, and rear wheels 16 are generally smaller steerable wheels. Motive force is selectively applied to front wheels 14 through a power plant in the form of a diesel engine 32 and a transmission (not shown). Although combine 10 is shown as including wheels, is also to be understood that combine 10 may include tracks, such as full tracks or half tracks.

Header 18 is mounted to the front of combine 10 and includes a cutter bar 34 for severing crops from a field during forward motion of combine 10. A rotatable reel 36 feeds the crop into header 18, and a double auger 38 feeds the severed crop laterally inwardly from each side toward feeder housing 20. Feeder housing 20 conveys the cut crop to threshing and separating system 24, and is selectively vertically movable using appropriate actuators, such as hydraulic cylinders (not shown).

Threshing and separating system 24 is of the axial-flow type, and generally includes a rotor 40 at least partially enclosed by and rotatable within a corresponding perforated concave 42. The cut crops are threshed and separated by the rotation of rotor 40 within concave 42, and larger elements, such as stalks, leaves and the like are discharged from the rear of combine 10. Smaller elements of crop material including grain and non-grain crop material, including particles lighter than grain, such as chaff, dust and straw, are discharged through perforations of concave 42.

Grain which has been separated by the threshing and separating assembly 24 falls onto a grain pan 44 and is conveyed toward cleaning system 26. Cleaning system 26 may include an optional pre-cleaning sieve 46, an upper sieve 48 (also known as a chaffer sieve), a lower sieve 50 (also known as a shoe sieve), and a cleaning fan 52. Grain on sieves 46, 48 and 50 is subjected to a cleaning action by fan 52 which provides an airflow through the sieves to remove chaff and other impurities such as dust from the grain by making this material airborne for discharge from straw hood 54 of combine 10. Grain pan 44 and pre-cleaning sieve 46 oscillate in a fore-to-aft manner to transport the grain and finer non-grain crop material to the upper surface of upper sieve 48. Upper sieve 48 and lower sieve 50 are vertically arranged relative to each other, and likewise oscillate in a fore-to-aft manner to spread the grain across sieves 48, 50, while permitting the passage of cleaned grain by gravity through the openings of sieves 48, 50.

Clean grain falls to a crop material conveyor system 56, which is represented in FIG. 1 as a rectangular box for ease of illustrating its relative position on the combine 10, positioned crosswise below and in front of lower sieve 50. While the crop material conveyor system 56 is described as conveying clean grain, it is contemplated that the crop material conveyor system 56 can convey other types of crop material that pass through the cleaning system, such as material other than grain. It should be appreciated that the crop material conveyor system 56 can include one or more crop material conveyors, as will be described below. Crop material conveyor system 56 receives clean grain from each sieve 48, 50 and from bottom pan 62 of cleaning system 26. Crop material conveyor system 56 conveys the clean grain laterally to a generally vertically arranged crop material elevator 60, which can also be referred to as a grain elevator when transporting clean grain, for transport to grain tank 28. It should be appreciated that while the crop material elevator 60 can be referred to as "a grain elevator," the crop material elevator 60 can also convey other types of crop material from the cleaning system 26, such as tailings. Tailings from cleaning system 26 fall to a tailings sheet 58. Tailings delivered by the tailings sheet 58 to the tailings auger 64 are transported to the upstream end of cleaning system 26 by the return auger 66 for repeated cleaning action. A pair of grain tank augers 68 at the bottom of grain tank 28 convey the clean grain laterally within grain tank 28 to unloading auger 30 for discharge from combine 10.

Figure 2:
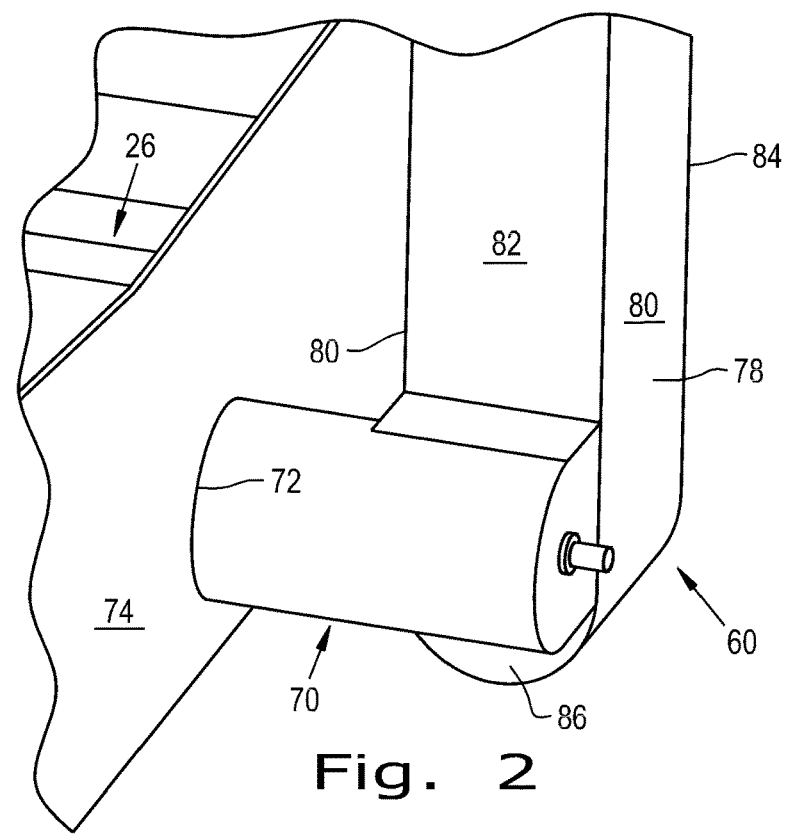
FIG. 2 is a perspective view of the agricultural harvester shown in FIG. 1.
Figure 3:
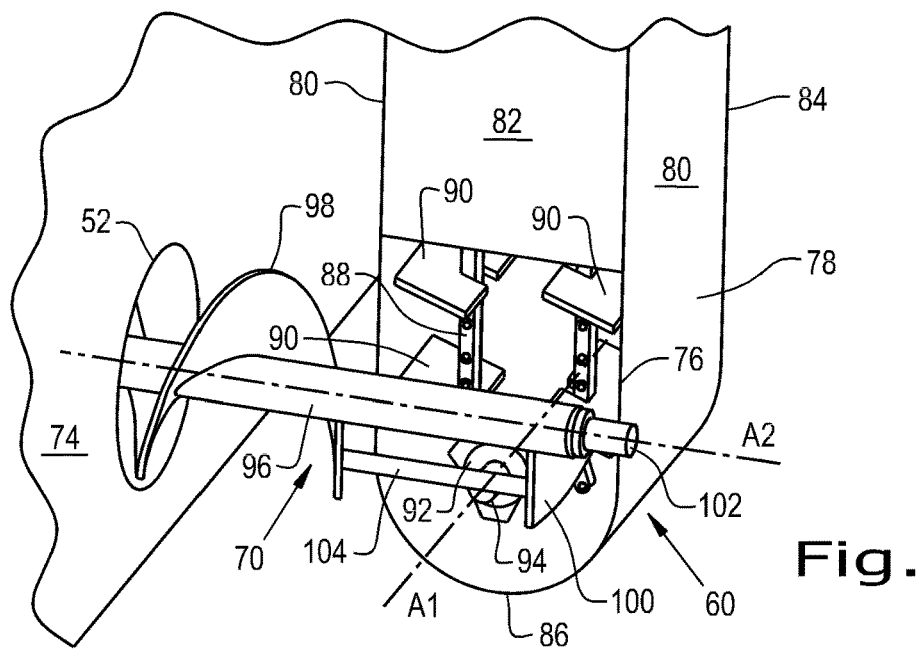
FIG. 3 is a perspective view of the agricultural harvester shown in FIGS. 1-2 with portions of an auger and a crop material elevator being cut away to show interior detail.

Referring now to FIGS. 2-3, the crop material elevator 60 and a crop material conveyor 70, shown as an auger, of the crop material conveyor system 56 are shown in better detail. As can be seen, the auger 70 can extend through a crop material opening 72 formed in a side sheet 74 of the agricultural harvester 10 to convey crop material from the cleaning system 26 to the crop material elevator 60 through an inlet 76 (shown in FIG. 3) formed in a housing 78 of the crop material elevator 60. While the crop material conveyor 70 is shown as an auger, any type of crop material conveyor can be used to supply cleaned crop material to the inlet 76. Other crop material conveyors that can be used include belts conveyors and scoop conveyors. The housing 78 includes a pair of side surfaces 80, a rear surface 82 which the inlet 76 can be formed through, a front surface 84, and a boot portion 86 forming a bottom of the housing 78. The side sheet 74, as shown, is a side wall of the cleaning system 26 that can help retain crop material within the agricultural harvester 10. It should be understood that the side sheet 74 does not need to be a side wall of the cleaning system 26, but could be any type of sheet or wall construction of the agricultural harvester 10.

Referring now to FIG. 3, portions of the auger 70 and elevator housing 78 have been cut away to show interior detail. As can be seen, the crop material elevator 60 includes a driving loop 88 that is held within the housing 78 and connected to paddles 90. While the driving loop 88 is shown as a link chain, the driving loop 88 can be any type of construction that allows for the paddles 90 to be rotated through the housing 78 by the driving loop 88 when the driving loop 88 is rotated. The driving loop 88 is wrapped around a rotating element 92, shown as a sprocket, which defines an axis of rotation A1 therethrough. The sprocket 92 can be rotated by an elevator shaft 94 that is driven by a mechanical system (not shown) of the agricultural harvester 10, or the driving loop 88 can be rotated by another rotating element (not shown) which will cause the sprocket 92 to rotate. As the sprocket 92 rotates, it causes the driving loop 88 and connected paddles 90 to rotate through the housing 78.

The sprocket 92 (or other rotating element) of crop material elevator 60 is arranged so that it rotates the paddles 90 about an axis of rotation A1 that is directed generally parallel to the longitudinal axis L1 of the agricultural harvester 10. As used herein, the term "generally parallel" is used to signify that the axis of rotation A1 extends such that it will not intersect the longitudinal axis L1 of the agricultural harvester 10 or, alternatively, if the axis of rotation A1 does intersect the longitudinal axis L1 of the agricultural harvester 10 the formed angle past the intersection will be in a range of between 1 to 5 degrees. In this sense, the crop material elevator 60 as a whole is "rotated" 90 degrees, relative to the agricultural harvester 10, compared to traditional crop material elevators, which rotate the paddles within the elevators about an axis of rotation that is generally transverse or perpendicular to the longitudinal axis of the combine. By rotating the crop material elevator 60 according to the present invention, the capacity of the crop material elevator 60 can be increased by making the paddles 90 wider without interfering with moving parts that are located adjacent to the crop material elevator 60, in addition to other benefits that will be described further below. It should be appreciated that when the side sheet 74 is a sidewall of the cleaning system 26, as shown in the figures, a side plane defined by the side sheet 74 can extend parallel with or along the longitudinal axis L1 of the combine 10. In this sense, the axis of rotation A1 is also parallel with the plane defined by the side sheet 74.

As can be seen in FIG. 3, the auger 70 can include an auger axle 96 defining a conveyor axis A2, which may also be referred to as a "conveyor axis of rotation," an auger flighting 98 that is rotated about the conveyor axis A2, and a reverse flighting 100 located near an end 102 of the auger axle 96. As can be seen, the conveyor axis A2 is generally transverse to the axis of rotation A1. The auger flighting 98 and reverse flighting 100 can both be formed as integral parts of the auger axle 96 or can be otherwise connected to the auger axle 96, such as by welding, so that the flightings 98 and 100 rotate about the conveyor axis A2 defined by the auger axle 96. The reverse flighting 100 has an opposite helical direction relative to the auger flighting 98, meaning that the reverse flighting 100 can be formed as righthand helical flighting when the auger flighting 98 is formed as lefthand helical flighting, or vice versa. The reverse flighting 100 can be connected to the auger flighting 98 by a connector 104, shown as a bar, allowing for the reverse flighting 100 to rotate about the conveyor axis A2 at the same rotational speed as the auger flighting 98. In such a configuration, the auger flighting 98 can convey cleaned crop material from the cleaning system 26 through the crop material opening 72 and toward the end 102 of the auger axle 96. Once the cleaned crop material reaches the bar 104 and reverse flighting 100, the cleaned crop material is "thrown" by the bar 104 toward the inlet 76, with the reverse flighting 100 directing the cleaned crop material toward the bar 104. This throwing action causes the cleaned crop material to be thrown generally parallel, relative to the axis of rotation A1, into the inlet 76 of the crop material elevator 60 so that it can be conveyed through the housing 78 by the paddles 90.

Figure 4:
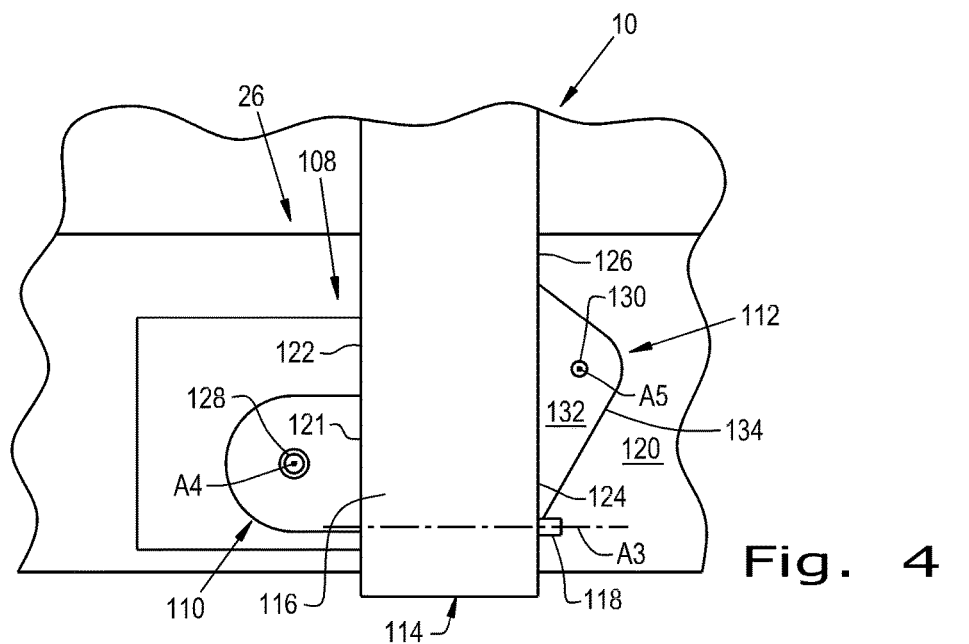
FIG. 4 is a perspective view of another embodiment of a side sheet, crop material conveyor system, and crop material elevator according to the present invention.

Referring now to FIG. 4, the agricultural harvester 10 is shown with a crop material conveyor system 108, which is interchangeable with crop material conveyor system 56 shown in FIGS. 1-3. The crop material conveyor system 108 includes a first crop material conveyor 110, shown as a first auger, a second crop material conveyor 112, shown as a second auger, and supplies cleaned crop material from the cleaning system 26 to a crop material elevator 114, which is interchangeable with the crop material elevator 60 previously described and shown in FIGS. 1-3. Unless explicitly stated otherwise, the agricultural harvester 10 shown in FIG. 4 is structurally identical to the agricultural harvester 10 shown in FIGS. 1-3. The crop material elevator 114 is structured similarly to and interchangeable with previously described crop material elevator 60, with a housing 116, a driving loop (not shown) held within the housing 116 that is connected to paddles (not shown), and a rotating element 118, shown as an elevator shaft connected to an unseen sprocket, configured to rotate the paddles about an axis of rotation A3 that is generally parallel to the longitudinal axis L1 of the agricultural harvester 10. As can be seen, the first auger 110 connects to an inlet 121 formed on a rear surface 122 of the housing 116 to supply cleaned crop material to the crop material elevator 114 and the second auger 112 connects to a second inlet 124 formed on a front surface 126 of the housing 116 to supply cleaned crop material to the crop material elevator 114. The first auger 110, which can also be referred to as a rear auger, can include an auger axle 128 defining a first conveyor axis A4 that extends into the page and the second auger 112, which can also be referred to as a front auger, can include a second auger axle 130 defining a second conveyor axis A5 that also extends into the page. As can be seen, the first conveyor axis A4 and second conveyor axis A5 can be generally parallel to each other and generally transverse to the axis of rotation A3, with the crop material elevator 114 being held in between the first conveyor axis A4 and the second conveyor axis A5. The side sheet 120 can have a crop material opening (not shown) formed through that the first auger 110 extends through to supply cleaned crop material from the cleaning system 26 to the inlet 121 and a second crop material opening (not shown) formed through that the second auger 112 extends through to supply cleaned crop material from the cleaning system 26 to the second inlet 124. The first auger 110 can be structured similarly to the auger 70 shown in FIGS. 2-3 so that cleaned crop material is thrown into the inlet 121 by the first auger 110. The second auger 112 can be located above the second inlet 124, relative to the ground, and include an auger flighting (not shown) that conveys cleaned crop material along the second auger axle 130 toward a transition area 132. The transition area 132 can include a sloped surface 134 that is directed toward the second inlet 124 such that cleaned crop material conveyed to the transition area 132 by the second auger 112 will drop onto the sloped surface 134 and be gravity fed into the second inlet 124. Such a configuration allows for cleaned crop material to be provided to the second inlet 124 by the second auger 112 without requiring an additional conveyor that draws power from the agricultural harvester 10.

Figure 5:
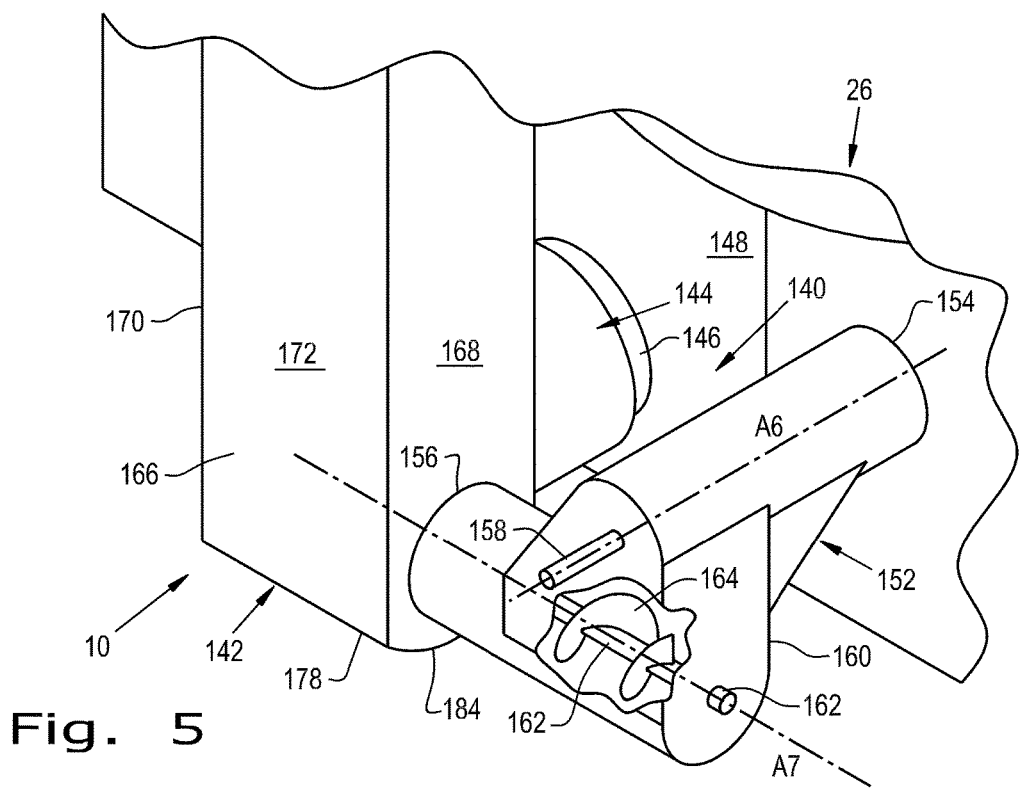
FIG. 5 is a perspective view of yet another embodiment of a side sheet, crop material conveyor system, and crop material elevator according to the present invention with a portion of the crop material conveyor system cut away to show interior detail.
Figure 6:
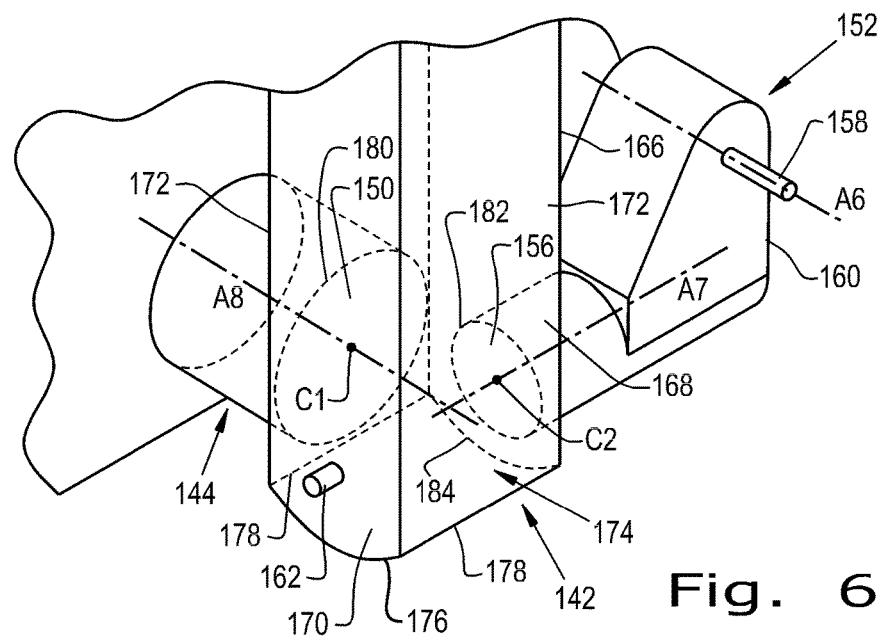
FIG. 6 is another perspective view of the agricultural harvester shown in FIG. 5 with portions of a crop material elevator cut away to show interior detail.
Figure 7:
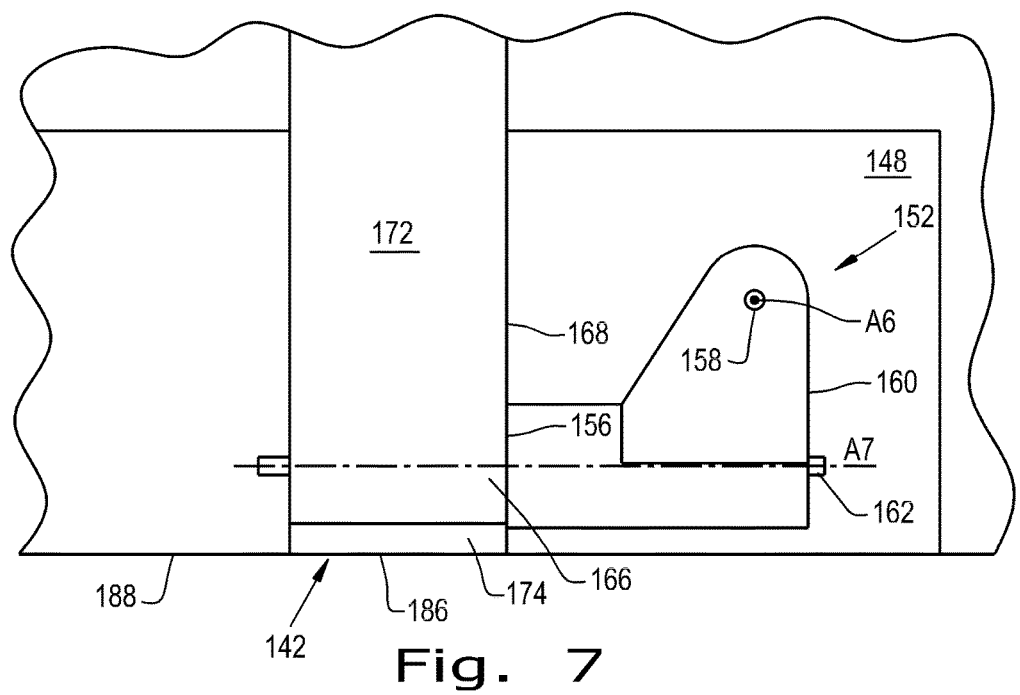
FIG. 7 is yet another perspective view of the agricultural harvester shown in FIGS. 5-6.

While clean crop material is shown in FIGS. 2-4 as being supplied to the crop material elevators through the front and rear surfaces of the elevators, clean crop material can also be supplied to a crop material elevator through a side surface of the crop material elevator. Referring now to FIGS. 5-7, the agricultural harvester 10 is shown with a crop material conveyor system 140, which is interchangeable with previously described crop material conveyor systems 56 and 108 shown in FIGS. 1-4, that provides cleaned crop material from the cleaning system 26 to a crop material elevator 142, which is interchangeable with previously described crop material elevators 60 and 114 shown in FIGS. 1-4. The crop material conveyor system 140 can include a first crop material conveyor 144, shown as a first auger, that extends through a first crop material opening 146 formed in a side sheet 148 to convey cleaned crop material to a first inlet 150 (shown in FIG. 6) of the crop material elevator 142 and a second crop material conveyor 152, shown as a second auger, that extends through a second crop material opening 154 formed in the side sheet 148 to convey cleaned crop material to a second inlet 156 of the crop material elevator 142. The first auger 144 can be structured as any type of conveyor that can transport cleaned crop material from the cleaning system 26 to the crop material elevator 142 through the first inlet 150. The second auger 152 can include an auger axle 158 defining an auger axis A6 with auger flighting (not shown) that rotates about auger axle 158, similar to previously described augers, to convey cleaned crop material toward a transition area 160. The auger axle 158 can be located above the second inlet 156, relative to the ground, so the transition area 160 allows for the cleaned crop material to be gravity fed to the same vertical level as the second inlet 156. The crop material elevator 142 can include a rotating element 162, shown as an elevator shaft connected to an unseen sprocket, that extends to the transition area 160 and has an auger flighting 164 partially surrounding the elevator shaft 162, forming an elevator auger that conveys cleaned crop material from the transition area 160 into the second inlet 156. The second auger 152 can also be configured similarly to the second auger 112 shown in FIG. 4, if desired.

The crop material elevator 142 includes a housing 166 with a front surface 168, a rear surface 170, and a pair of side surfaces 172. As can be seen, the first inlet 150 can be formed through one of the side surfaces 172 and the second inlet 156 can be formed through the front surface 168. The elevator shaft 162 can rotate a sprocket (not shown) and a driving loop (not shown) with connected paddles (not shown) to rotate the paddles through the housing 166, similar to previously described crop material elevators 60 and 114. The elevator shaft 162 defines an axis of rotation A7 that is generally parallel to the longitudinal axis L1 of the agricultural harvester 10 and can be rotated by being linked to the auger axle 158, which allows for the rotational speed and direction of the elevator shaft 162 to be controlled by the rotational speed and direction of the auger axle 158, or can be rotated by rotation of the driving loop.

Referring now to FIG. 6, portions of the elevator housing 166 are cut away to show interior detail of the housing 166. The driving loop, paddles, and rotating element are intentionally omitted from view to better show the structure of the housing 166, but would normally be present inside the housing 166. As can be seen, the housing 166 includes a boot portion 174 that defines a bottom portion of the housing 166. The boot portion 174 has a curved surface 176 in between a pair of straight edges 178 that meet the pair of side surfaces 172. This configuration allows the paddles to rotate within the boot portion 174 at the bottom of the housing 166 before raising cleaned crop material up the crop material elevator 142. The first inlet 150 and second inlet 156 are shown as being circular openings formed in one of the side surfaces 172 and the front surface 168, respectively. While the first inlet 150 and second inlet 156 are shown as being circular openings, they could also be formed as any shape of opening. As can be seen, the first inlet 150 has a perimeter 180, which is a circumference when referring to a circular shape, defined about a center C1 and the second inlet 156 has a perimeter 182, which is a circumference when referring to a circular shape, defined about a center C2. The radius of the circumference 180 of the first inlet 150 can be chosen so that one of the straight edges 178 is tangential to the circumference 180. The center C1 can be placed at a midpoint of the side surface 172, so that the first inlet 150 is centered between edges of the side surface 172. The center C1 can also be placed so that it is aligned with a conveyor axis A8 defined by the first auger 144. Such a configuration can provide a continuous surface between the first auger 144 and the area adjacent the first inlet 150 where the paddles sweep cleaned crop material away, which can provide a short travel path for the cleaned crop material before being raised by the paddles. The circumference 182 of the second inlet 156 can be defined about the center C2 and have a radius that allows the circumference 182 to be centered in the front surface 168. Optionally, the circumference 182 of the second inlet 156 can extend so that a curved edge 184 of the front surface 168 is tangential to the circumference 182 of the second inlet 156. Similarly to the first inlet 150, the second inlet 156 can have its center C2 aligned with the axis of rotation A7 of the elevator shaft 162. It should be appreciated that when the first inlet 150 and second inlet 156 are not circular shapes, the described centers of the inlets 150 and 156 can refer to geometric centers of the inlets 150 and 156 and the described circumferences of the inlets 150 and 156 can refer to perimeters of the inlets 150 and 156.

Referring now to FIG. 7, it can be seen that the boot portion 174 of the housing 166 has a boot bottom 186 that is the bottom-most point of the crop material elevator 142 relative to the ground. In a traditional combine harvester that does not have a rotated crop material elevator, the boot bottom 186 can be anywhere between 25 to 50 mm below the next lowest part of the combine harvester. By configuring the crop material elevator 142 as shown in FIGS. 5-7 with the first inlet 150 centered on the side surface 172 and conveyor axis A8, the crop material elevator 142 can be carried so that the boot bottom 186 does not extend below the bottom of the agricultural harvester 10, which, as shown, is a bottom 188 of the side sheet 148. The boot bottom 186 can therefore be aligned with the bottom 188 of the side sheet 148 to increase the overall ground clearance of the combine harvester 10, i.e., the boot bottom 186 does not extend below the bottom 188 of the side sheet 148 relative to the ground.

While this invention has been described with respect to at least one embodiment, the present invention can be further modified within the spirit and scope of this disclosure. This application is therefore intended to cover any variations, uses, or adaptations of the invention using its general principles. Further, this application is intended to cover such departures from the present disclosure as come within known or customary practice in the art to which this invention pertains and which fall within the limits of the appended claims.

What is claimed is:

1. An agricultural harvester defining a longitudinal axis, comprising:
   a chassis;
   at least one ground engaging traction member carried by said chassis;
   a cleaning system carried by said chassis and configured to clean crop material;
   a generally vertical crop material elevator carried by said chassis, said crop material elevator including:
   a housing having an inlet formed therethrough;
   a driving loop held within said housing;
   a plurality of paddles connected to said driving loop; and
   a rotating element configured to rotate said plurality of paddles about an axis of rotation that is generally parallel to said longitudinal axis; and
   a crop material conveyor configured to supply cleaned crop material to said inlet from said cleaning system, said crop material conveyor defining a conveyor axis of rotation that is generally transverse to said axis of rotation about which said plurality of paddles rotate.

2. The agricultural harvester according to claim 1, wherein said crop material conveyor does not extend into said housing.

3. The agricultural harvester according to claim 1, further comprising a side sheet having a crop material opening formed through, said crop material conveyor being configured to convey cleaned crop material through said crop material opening.

4. The agricultural harvester according to claim 3, further comprising a second crop material conveyor, said side sheet having a second crop material opening formed through, said second crop material conveyor extending through said second crop material opening, said housing including a second inlet formed therethrough, said second crop material conveyor being configured to supply cleaned crop material to said second inlet.

5. The agricultural harvester according to claim 4, wherein said second crop material conveyor defines a second conveyor axis, said crop material elevator being carried by said chassis between said conveyor axis of rotation and said second conveyor axis.

6. The agricultural harvester according to claim 5, wherein said housing includes a front surface and a rear surface, said second inlet being located on said front surface and said inlet being located on said rear surface.

7. The agricultural harvester according to claim 4, wherein said second crop material conveyor includes a transition area connecting said crop material conveyor to said second inlet, said transition area gravity feeding the cleaned crop material to said second inlet.

8. The agricultural harvester according to claim 4, wherein said rotating element includes an elevator shaft defining said axis of rotation, at least a portion of said elevator shaft including an auger flighting to form an elevator auger.

9. The agricultural harvester according to claim 8, wherein said housing has a boot portion with a boot bottom and said second crop material conveyor is located above said boot bottom, said second crop material conveyor including a transition area gravity feeding the cleaned crop material to said elevator auger.

10. The agricultural harvester according to claim 4, wherein said housing has a side surface and a front surface, said first inlet being formed on said side surface and said second inlet being formed on said front surface.

11. The agricultural harvester according to claim 3, wherein said side sheet defines a side plane, said axis of rotation being generally parallel to said side plane.

12. The agricultural harvester according to claim 3, wherein said side sheet has a bottom, said bottom of said side sheet defining a bottom of said agricultural harvester, and said housing has a boot portion with a boot bottom, said boot bottom being held level with said bottom of said side sheet.

13. The agricultural harvester according to claim 1, wherein said crop material conveyor is an auger including an auger axle defining said conveyor axis of rotation and an auger flighting rotated about said auger axle.

14. The agricultural harvester according to claim 1, wherein said inlet is an opening formed through said housing defining a center that is aligned with said conveyor axis of rotation.

15. The agricultural harvester according to claim 1, wherein said inlet is an opening formed through said housing defining a perimeter, said housing having a boot portion with a pair of straight edges, at least one of said pair of straight edges being tangential to said perimeter.

16. The agricultural harvester according to claim 1, wherein said crop material conveyor is configured to convey cleaned crop material to said inlet generally transverse to said axis of rotation.

17. A crop material transport system, including:
   a cleaning system including a side sheet defining a side plane and having a crop material opening formed through and a crop material conveyor extending through said crop material opening, said cleaning system being configured to clean harvested crop material; and
   a generally vertically crop material elevator supplied with cleaned crop material from said crop material conveyor, said crop material elevator including:
   a housing having an inlet formed therethrough, said inlet being supplied with the cleaned crop material;
   a driving loop held within said housing;

a plurality of paddles connected to said driving loop; and a rotating element configured to rotate said plurality of paddles about an axis of rotation that is generally parallel to said side sheet, said crop material conveyor defining a conveyor axis of rotation that is generally transverse to said axis of rotation about which said plurality of paddles rotate.

18. The crop material transport system according to claim 17, further comprising a second crop material conveyor, said side sheet having a second crop material opening formed through, said second crop material conveyor extending through said second crop material opening, said housing including a second inlet formed therethrough, said second crop material conveyor being configured to supply cleaned crop material to said second inlet.

19. The crop material transport system according to claim 18, wherein said inlet is an opening formed through said housing, said opening defining a center that is aligned with said conveyor axis of rotation.

\* \* \* \* \*